C. F. MEGOW.
TRACTION BEARING WHEEL.
APPLICATION FILED JULY 13, 1916.
1,241,870.
Patented Oct. 2, 1917.
2 SHEETS—SHEET 2.
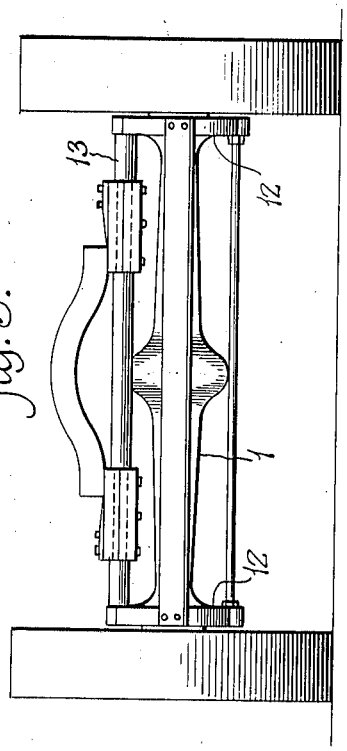
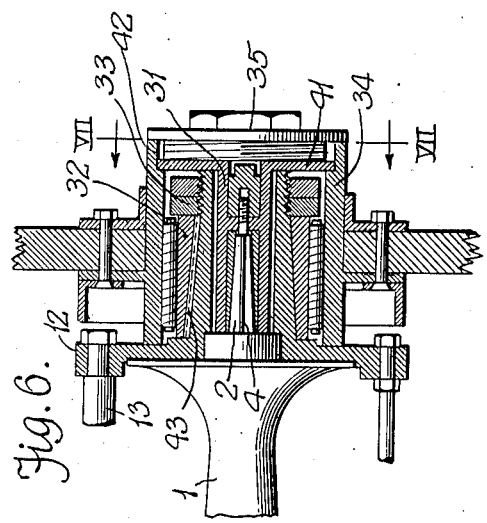
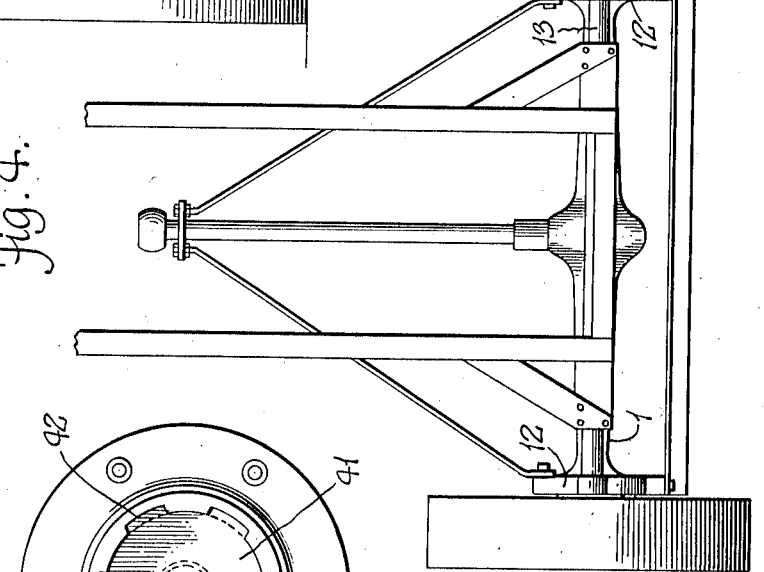
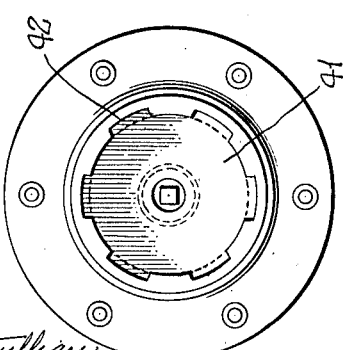
Inventor
Charles F. Megow,
Witness
Chas. W. Stauffiger
Charles Balg
By
Attorneys

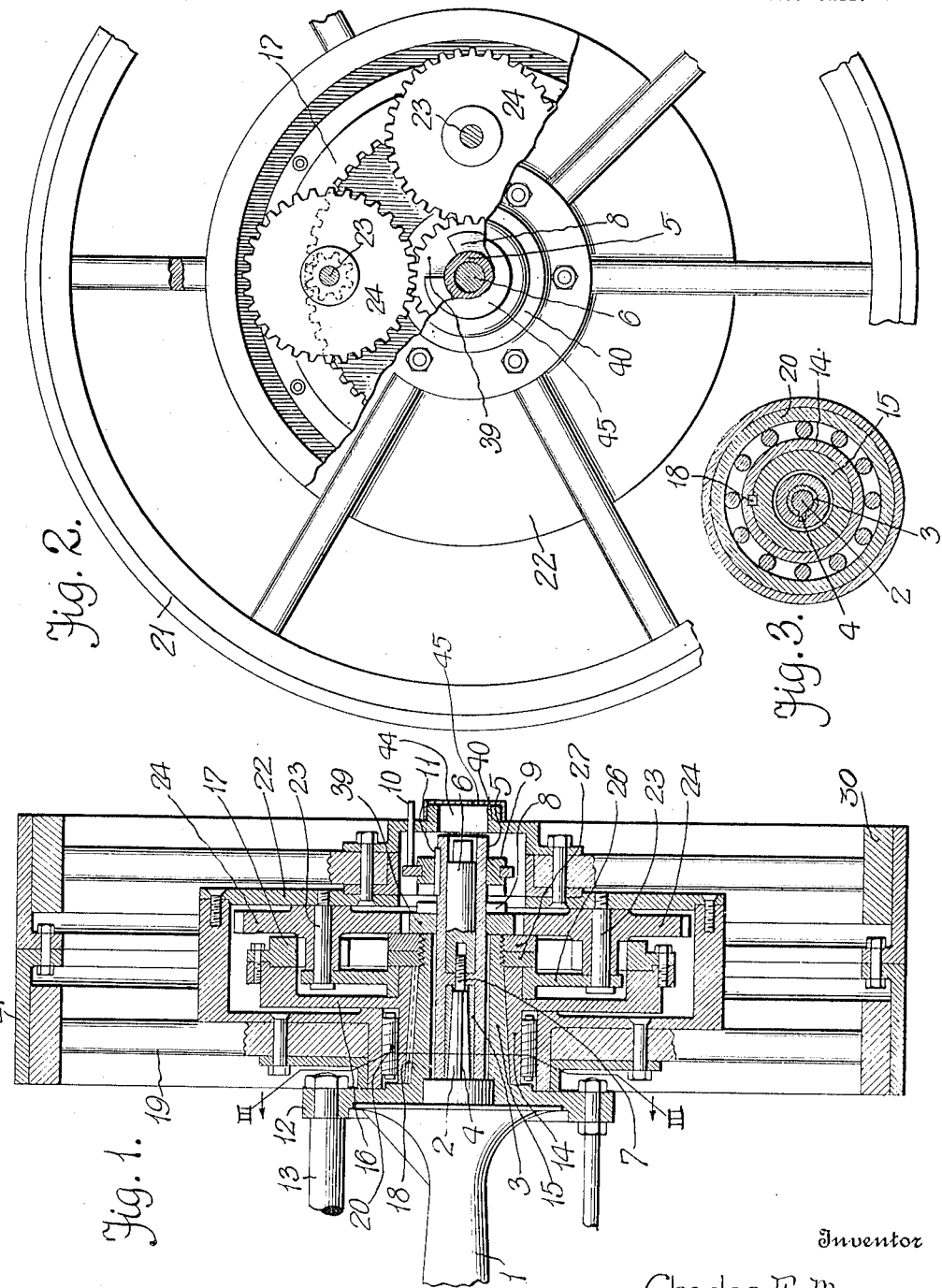

UNITED STATES PATENT OFFICE.

CHARLES F. MEGOW, OF DETROIT, MICHIGAN.

TRACTION BEARING-WHEEL.

1,241,870.   Specification of Letters Patent.   Patented Oct. 2, 1917.

Application filed July 13, 1916. Serial No. 108,971.

*To all whom it may concern:*

Be it known that I, CHARLES F. MEGOW, a citizen of the United States of America, residing at Detroit, in the county of Wayne and State of Michigan, have invented certain new and useful Improvements in Traction Bearing-Wheels, of which the following is a specification, reference being had therein to the accompanying drawings.

This invention relates to traction bearing wheels adapted to be secured to the standard driving axle of an automobile in place of the ordinary wheel, whereby a touring car for example, may be changed to a truck, the device also including means for taking off power directly from the rear axle by means of a pulley or the like without disturbing the general assembly.

The invention consists in the matters hereinafter set forth, and more particularly pointed out in the appended claims.

In the drawings,

Figure 1 is a view in transverse section of a mechanism that embodies features of the invention;

Fig. 2 is a view in side elevation of the wheel with parts broken away to give clear view;

Fig. 3 is a view in detail taken on or about line III—III of Fig. 1;

Fig. 4 is a plan view showing the general arrangement for stiffening the rear axle and parts when assembled;

Fig. 5 is a view in rear elevation of the axle and assembled parts;

Fig. 6 is a view in section of a modification of the device, and

Fig. 7 is a view in section of part of the device taken on or about line VII—VII of Fig. 6.

In the drawings, a rear drive axle is shown provided with the usual outer housing 1 and inner drive shaft 2 splined keyed or otherwise fitted for the connection with a wheel of ordinary type. A split sleeve 3, the separated edges of which afford accommodations for the regular key or spline 4, is forced onto the shaft and held there by a bushing 5 that is driven home and held in place by an elongated nut 6 engaging the usual cap screw stud 7 of the draft. The bushing 5 carries a gear 39 rotatable thereon and provided with clutch keys 8 or projections adapted to interlock with corresponding projections of a clutch ring 9 that is reciprocable on the sleeve 5 as by means of a finger rod 10 or the like hooking into a peripheral groove of the ring, the ring being keyed by a spline 11 or the like to turn with the bushing 5.

Spiders 12 are secured each on the end face of the housing 1, preferably by suitable cross members 13 which, as indicated in Figs. 4 and 5, may conveniently be used as stiffening members of the rear axle, and for spring perches and draft rigging attachments. An elongated outwardly tapered hub 14 on each spider loosely encircles the bushing 5, and supports a bearing hub 15 which with an extended circular flange 16, and internally toothed annulus 17 appropriately connected thereto constitutes an internal gear. A key 18, spline or the like prevents inter-rotation of the members 12 and 15. A wheel 19 is journaled as by suitable anti-friction bearing rolls 20 on the inner portion of the internal gear hub 15 and carries a drum 21 housing the gear annulus 17 and having a plate 22 on which bearing spindles 23 provide support for two-step planetary gears 24 in mesh respectively with the annulus 17 and the driving gear 39. To further support the carrying members 23, an inner plate 26 is provided which is rotatably secured on the hub 15, jam nuts 27 or the like holding the parts in proper relation.

An outer wheel hub 28 may be secured to the plate 22 to carry an outer wheel 30 and thus provide broad tread, if desired.

As a result of this invention a traction bearing wheel is obtained that is readily mounted on a rear axle of standard or conventional type so as to effectively carry a load of great weight. When the clutch is out the bearing wheel may run as an ordinary wheel without tractive effect, if desired.

When it is not desired to use a double set of wheels and to eliminate the reduction gained by the planetary gear, the construction shown in Figs. 6 and 7 may be used in which a shorter bushing 31 replaces the bushing 5 and a straight raceway ring 32 is placed thereon and secured by jam nuts 33 and a key 43. The hub 34 of a wheel is held in place both by the shorter sleeve 31 and an applied screw cap 35, the sleeve having a flange with notches 42, to non-rotatably engage with the hub sleeve 34 of the wheel and thereby drive the latter at full speed.

Similarly if it is desired to take off power as through a belt or the like, from the rear axle, the sleeve 5 with pinion 39 and clutch 9 may be removed and by substitution of a sleeve similar to the sleeve 5 with a pulley keyed thereon, which is journaled in the opening 44 of the cap 40, when the dust shield 45 is removed, the power plant of the vehicle may be used to drive stationary machinery without further changing of the parts.

Obviously, changes in the details of construction may be made without departing from the spirit of my invention and I do not care to limit myself to any particular form or arrangement of parts.

What I claim is:—

1. In an automobile, the combination of a drive axle including an outer housing and inner drive shaft having protruding tapered end portions of split sleeves adapted to be secured on the end portions, spiders adapted to be secured each on the end portion of the housing with a hub encircling the sleeve portion, a flanged outer hub carrying an internal gear annulus, a wheel journaled on the outer hub having a drum housing the flange and annulus, a gear rotatable concentric with the sleeve, planetary pinions carried by the wheel drum in mesh respectively with the annulus and gear, and an outer wheel body adapted to be attached to the main wheel body.

2. In an automobile, the combination of a drive axle including an outer housing and inner drive shaft having protruding tapered end portions, spiders adapted to be secured each on the end portion of the housing with a hub encircling the sleeve portion, a flanged outer hub carrying an internal gear annulus, a wheel journaled on the outer hub having a drum housing the flange and annulus, a bushing on the sleeve, a gear rotatable on the bushing, planetary pinions carried by the wheel drum in mesh respectively with the annulus and gear, an outer wheel body adapted to be attached to the main wheel body, and clutch means for detachably connecting the gear and bushing.

3. In an automobile, the combination of the driving axle thereof including a stationary housing and driving shaft with protruding tapered end portions, of spiders each adapted to be secured to the end portion of the housing and provided with an outwardly extending hub loosely encircling the tapered portion of the shaft, a split sleeve engaging each tapered end portion of the shaft, a bushing on the sleeve within the spider hub extending beyond the spider hub, a nut engaging the end portion of the drive shaft and securing the bushing and sleeve, a gear journaled in the bushing adjacent the end portion of the spider hub, a clutch ring longitudinally reciprocable and non-rotatable on the bushing adapted to interlock with the gear, means for shifting the clutch ring, a flanged bearing hub secured on the spider hub, an inner gear annulus on the flange of the bearing hub, a wheel journaled on the flanged bearing hub, a drum on the wheel carrying planetary gears meshing with the bushing gear and the annulus, and an outer wheel body adapted to be detachably secured to the inner wheel provided with means for housing the clutch ring and adjacent portions of the assembled members.

4. In an automobile, the combination of a driving axle thereof, including a stationary housing and a driving shaft having protruding tapered end portions, with spiders adapted to be secured each against an end portion of the housing and provided with outwardly tapered hubs extending over the end portions of the driving shaft, members connecting the spiders and reinforcing the housing, a tapered split sleeve engaging the end portion of each driving shaft, a key on each tapered portion of the shaft engaging the slot of the companion split sleeve, an elongated bushing on the sleeve protruding beyond the hub of the companion spider, a gear rotatable on the protruding portion of the bushing, means for clutching the gears to turn with the bushing, a flanged bearing hub on each spider hub, a wheel journaled on each hub between the flange thereof and the companion spider, an inturned gear annulus on the flange of the hub, planetary pinions on each wheel meshing with the annulus and bushing gear, and a wheel body adapted to be detachably secured to the main wheel.

In testimony whrereof I affix my signature in presence of two witnesses.

CHARLES F. MEGOW.

Witnesses:
 ANNA M. DORR,
 G. E. MCGRANN.